__

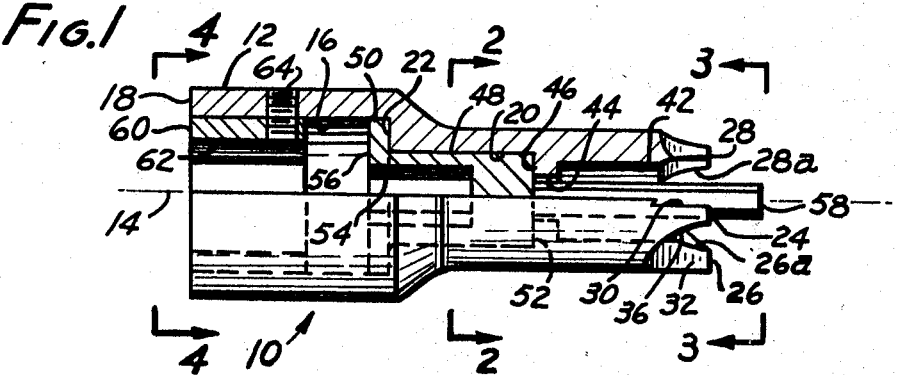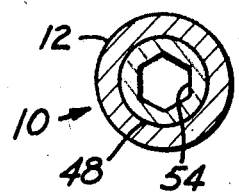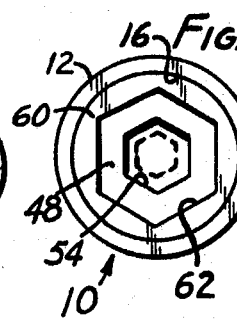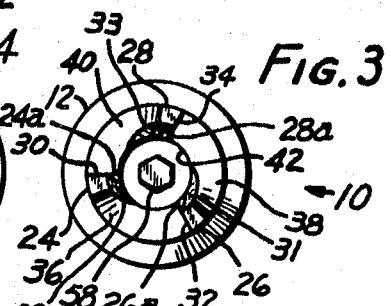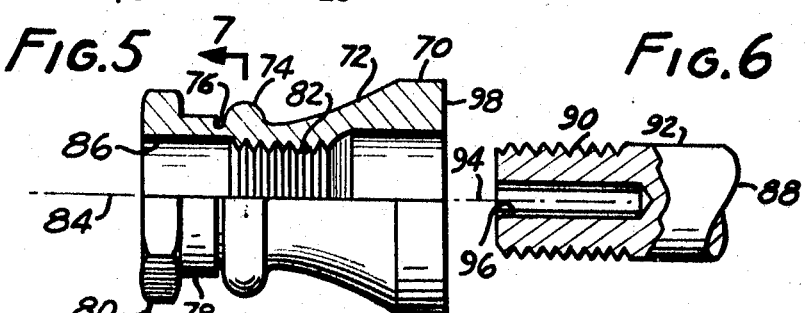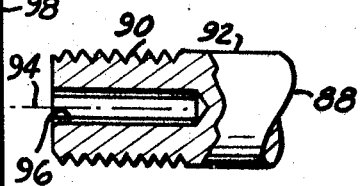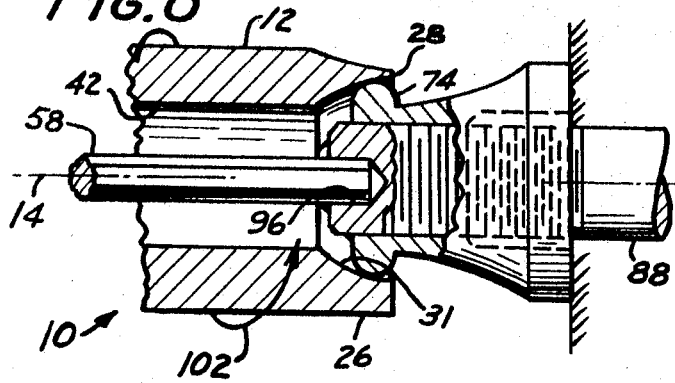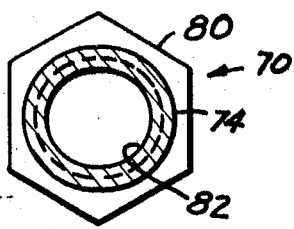
INVENTOR.
KENNETH L. WAGNER, JR.
BY
ATTORNEYS.

United States Patent Office 3,457,812
Patented July 29, 1969

3,457,812
TOOLS HAVING TEETH WITH CUTTING EDGES FOR GRIPPING AND DISASSEMBLING FASTENERS
Kenneth L. Wagner, Jr., El Segundo, Calif., assignor to Hi-Shear Corporation, Torrance, Calif., a corporation of California
Filed Sept. 21, 1967, Ser. No. 669,491
Int. Cl. B25b 13/00, 21/02
U.S. Cl. 81—53.2         1 Claim

ABSTRACT OF THE DISCLOSURE

This disclosure relates to tools for disassembling assembled threaded fasteners; and particularly to tools for disassembling assembled fastener elements, at least one of which elements does not include a wrench-engaging surface but which still must be turned to disengage the elements.

A tool according to the present invention comprises a housing having an axis. A plurality of teeth is supported by the housing. The teeth are adapted to engage that element of the fastener which does not have a wrench-engaging surface. Each tooth also has a cutting edge adapted to cut and ultimately grip that element.

According to an optional and desirable feature of the present invention, a pin is supported in the housing and is capable of rotating relative to the housing, so that the pin can be held against rotation. The pin is adapted to engage a wrench-engaging surface on the other element to hold that element against rotation while the other is spun off.

---

This invention relates to tools for disassembling assembled fasteners; particularly to tools for disassembling assembled fasteners, at least one of whose elements does not include a wrench-engaging surface.

It is often necessary to disassemble previously assembled threaded fasteners, such as a nut and a bolt. Typically, the same tool used to assemble the fasteners is used to disassemble the fasteners. For example, many fasteners include a suitable wrench-engaging surface, and the same type of wrench used for assembling the fasteners is used for disassembling the fasteners. However, it sometimes occurs that the wrench-engaging surface on one of the fasteners becomes distorted, for example, by stripping the fastener of its wrench-engaging surface, and the tool utilized for assembling the fasteners is rendered useless for disassembling the fasteners. Also, there exists a class of fasteners having a separate driving portion on one fastener element, such as the nut, whereby a suitable wrench-engaging surface of the fastener is driven with a wrench during the assembly operation, and upon the application of a designated torque, the driving portion breaks from the fastener and is discarded. In contrast to a common nut, no driving surfaces remain to which a wrench can be applied to remove this element.

It is an object of the present invention to provide a tool for separating assembled fasteners, at least one of which does not include a wrench-engaging surface.

Another object of the present invention is to provide a tool for separating assembled fasteners of the type whose driving portions have been removed or distorted.

A tool according to the present invention for disassembling a pair of assembled fasteners, one of which fasteners does not have a wrench-engaging surface, comprises a housing having an axis. A plurality of teeth is supported by the housing and is adapted to engage a portion of the fastener not having a wrench-engaging surface. Each tooth has a cutting edge adapted to cut into and finally engage a portion of the fastener not having a wrench-engaging surface.

According to an optional and desirable feature of the present invention, a pin is rotatably supported in the housing which engages and can restrain the other element of the fastener.

The above and other features of this invention will be more fully understood from the following detailed description and the accompanying drawings, in which:

FIG. 1 is a side view elevation, partly in cutaway cross-section, of a tool according to the presently preferred embodiment of the present invention;

FIG. 2 is a cross-section of the tool taken at line 2—2 in FIG. 1;

FIG. 3 is an end view elevation of the tool taken at line 3—3 in FIG. 1;

FIG. 4 is an end view of the tool taken at line 4—4 in FIG. 1;

FIG. 5 is a side view, partly in cutaway cross-section, of one element of a fastener, which has a separable driving head;

FIG. 6 is a side view elevation in cutaway cross-section of another element, which is adapted to be assembled to the element illustrated in FIG. 5;

FIG. 7 is a cross-section of the element illustrated in FIG. 5 taken at line 7—7 in FIG. 4; and FIG. 8 is a side view, partly in cutaway cross-section, of the tool illustrated in FIGS. 1–4, in the process of disassembling an assembled fastener as illustrated in FIGS. 5–7.

Referring now to the drawings, and particularly to FIGS. 1–4, a tool for disassembling an assembled fastener according to the presently preferred embodiment of the present invention is illustrated generally at 10. Tool 10 comprises housing 12 have an axis 14. Bore 16 is formed in the housing from face 18, and bore 20 is counterbored from bore 16 thereby forming shoulder 22 between them.

A plurality of teeth 24, 26 and 28 is formed at one end of housing 12 opposite from face 18, and each tooth includes a substantially flat surface 30, 32 and 34, respectively, disposed substantially parallel to axis 14 of the housing so as to define the crest and root of each tooth.

Surfaces 36, 38 and 40 form a transition between the crest of each tooth 24, 26 and 28 and the root of the next tooth 26, 28 and 24, respectively. The end of housing 12 which includes teeth 24, 26 and 28 contains bore 42, and surfaces 29, 31 and 33 form a transition between the crest of each tooth 24, 26 and 28 and bore 42. A gripping or cutting edge 24a, 26a, and 28a is formed at the junction of each of surfaces 29 and 30, 31 and 32, and 33 and 34. An additional bore 44 is located between bores 20 and 42, thereby forming lip 46 between bores 20 and 44.

Pin 48 is slidably mounted in bores 16 and 20 and includes lip 50 adapted to abut shoulder 22. Also, shoulder 52 of pin 48 is adapted to abut lip 46. Pin 48 includes a suitable axial wrench-receiving recess 54. By way of example, wrench-receiving recess 54 may be a hexagonal cross-section of the type for receiving Allen-type wrenches. A suitable wrench mechanism 58 is attached to pin 48 at the end opposite face 56. By way of example, wrench mechanism 58 may be a hexagonal wrenching device of the class known as an Allen-type wrench.

Recessed into bore 16 at the end of housing 12 adjacent face 18 is plug 60 having a wrench-receiving surface 62. Wrench-receiving surface 62 may, for example, be of hexagonal cross-section for receiving Allen-type wrenches. Lock screw 64 is threaded through housing 12 and plug 60 to prevent relative rotation thereof about axis 14.

Pin 48 is capable of sliding within housing 12 between one position wherein lip 50 abuts shoulder 22 and a second position wherein lip 50 abuts plug 60. Pin 48 is rotatable within housing 12 so that the pin and housing are independently rotatable about axis 14.

In FIGS. 5 and 7 there is illustrated a fastener 70 of the type having a separable driving portion whereby upon the application of a designated torque to the driving portion, the driving portion breaks from the fastener element and is discarded. Fastener elements of this class are described in United States Patent 2,940,495 issued to George S. Wing on June 4, 1960; United States Patent 3,138,987 issued to George S. Wing on June 30, 1964; and Design Patent 191,883 issued to George S. Wing on Dec. 5, 1961. Reference may be made to those patents for a more detailed description of fastener elements with separable driving heads.

In its most basic form, fastener element 70 includes a flared portion 72, a bead portion 74, a groove portion 76, and a driving portion 78 having wrench-engaging surface 80. Threaded portion 82 is axially located in fastener 70. Bore 86 is provided adjacent threaded portion 82 and radially opposite groove 76 and driving portion 78.

In FIG. 6, a suitable fastener element 88 having an axis 94 is illustrated which in engageable to fastener element 70. Fastener element 88 includes an external threaded portion 90 disposed axially on shank 92, and a wrench-engaging surface 96. By way of example, surface 96 may be a wrench-engaging recess, such as a hexagonal recess so as to receive Allen-type wrenches.

To assemble fastener elements 70 and 88, illustrated in FIGS. 5–7, threaded portion 82 of fastener element 70 is mated to threaded portion 90 of fastener element 88, and the two elements are rotated relative to each other so as to cause an axial motion along their common axis. When the applied torque reaches a design level, fastener element 70 fails at groove 76 so as to remove driving portion 78 and wrench-engaging surface 80. The completed assembly is illustrated in FIG. 8.

In FIG. 8, tool 10 is shown in the operation of separating and disassembling fastener elements 70 and 88. Wrench mechanism 58 of tool 10 is received in wrench-engaging recess 96 of fastener element 88. Likewise, teeth 24, 26 and 28 of tool 10 engage and shave away bead 74 of fastener element 70. Finally, the relatively sharp edges 24a, 26a, and 28a of teeth 24, 26 and 28, respectively, "bite" into bead 74. The shaving away of the bead (which bead often has been ovalled, and then rounded out in the process of forming the joint in order to provide a retention feature) removes one of the retentive elements, and the nut is readily unthreaded thereafter.

Disassembly is accomplished by relatively rotating housing 12 and pin 48. By way of example, if pin 48 is secured so that it will not rotate, and if housing 12 is rotated counterclockwise (to separate right-hand threaded fasteners) as indicated by arrow 102, the fasteners will become disassembled due to the cutting away, and the negative torque applied.

Relative rotation of housing 12 and pin 48 may be provided by engaging wrench-receiving surfaces 62 and 54, respectively, with a pair of concentric Allen-type wrenches of proper size and length (not shown), and relatively rotating the Allen-type wrenches by hand or motor in order to achieve relative rotation of the housing and pin. Pin 48 is freely rotatable within housing 12.

The present invention thus provides a tool for separating assembled fasteners, and is particularly useful to disassemble fasteners which do not have suitable wrench-engaging surfaces for this purpose. For example, the tool may be used for removing common fasteners whose wrench-engaging surfaces have been distorted, or fasteners having wrench-engaging surfaces which have been purposely removed during assembly. The tool is simple to use, relatively inexpensive, and may be operated either by hand or by a power assembly.

This invention is not to be limited by the embodiment shown in the drawings and described in the description, which is given by way of example and not of limitation, but only in accordance with the scope of the appended claim.

What is claimed is:

1. A tool for disassembling a pair of assembled fastener elements, one of said elements having no effective wrench-engaging surface, said tool comprising: a housing having an axis; a bore in said axis; a plurality of teeth on said housing, each of said teeth having a crest, a first surface disposed substantially parallel to said axis, a second surface forming a transition between the crest of each tooth and said bore, and a cutting edge between said first and said second surfaces, said cutting edge being adapted to cut and grip that element not having an effective wrench-engaging surface; a pin rotatably supported in said housing, said pin being axially movable in said housing between a first and a second position; means supported by said housing defining the first and second positions of said pin; said pin having a wrenching surface adapted to engage the other of said elements and restrain the other of said elements against rotation, said pin and said housing being adapted to be rotated relative to each other whereby when said teeth grip said one element as said housing is rotated about said axis in a direction designed to disassemble said fastener elements, one of said elements is rotated relative to the other thereby disassembling them.

References Cited

UNITED STATES PATENTS

| | | | |
|---|---|---|---|
| 1,093,252 | 4/1914 | Carnes | 81—53 X |
| 2,622,466 | 12/1952 | Vanden Bos et al. | 81—53 |
| 2,694,328 | 11/1954 | La Freniere | 81—53 |
| 3,106,233 | 10/1963 | Wolny | 81—53 X |

MYRON C. KRUSE, Primary Examiner